United States Patent [19]

Gotou

[11] Patent Number: 5,150,582
[45] Date of Patent: Sep. 29, 1992

[54] MULTIPLE AIR CONDITIONING APPARATUS

[75] Inventor: Yukifumi Gotou, Shizuoka, Japan
[73] Assignee: Kabushiki Kaisha Toshiba, Kawasaki, Japan
[21] Appl. No.: 648,645
[22] Filed: Jan. 31, 1991
[30] Foreign Application Priority Data
  Feb. 14, 1990 [JP] Japan .................... 2-31483
[51] Int. Cl.$^5$ ........................... F25D 21/00
[52] U.S. Cl. ...................... 62/155; 62/156; 62/234; 62/160; 62/278; 62/324.5
[58] Field of Search .............. 62/234, 155, 156, 160, 62/81, 278, 324.5, 228.5, 228.4, 196.4

[56] References Cited

U.S. PATENT DOCUMENTS 3,273,635 9/1966 Jobes .................. 62/155 X
3,466,888 9/1969 Kyle .................... 62/156
4,878,357 11/1989 Sekigami et al. ............ 62/160

FOREIGN PATENT DOCUMENTS 61-45145 10/1986 Japan .
64-57061 3/1989 Japan .

Primary Examiner—John Sollecito
Attorney, Agent, or Firm—Foley & Lardner

[57] ABSTRACT

In multiple system type air conditioner, there are provided an auxiliary outdoor heat exchanger provided in an outdoor unit, and defrosting device that, on heating operation, periodically or as needed feeds the refrigerant discharged from the compressor to the outdoor heat exchanger and all the indoor heat exchangers. After the refrigerant has passed through the outdoor heat exchanger and all the indoor heat exchangers, the refrigerant returns to the compressors through the auxiliary outdoor heat exchanger.

13 Claims, 4 Drawing Sheets

MULTIPLE AIR CONDITIONING APPARATUS

BACKGROUND OF THE INVENTION

1. Field of the Invention

The present invention relates, in general, to a multi system type air conditioning apparatus capable of air conditioning a plurality of rooms.

2. Description of the Related Art

In general, a multi system type air conditioner is equipped with a single outdoor unit provided with at least a compressor and outdoor heat exchanger, and a plurality of indoor units each having at least one indoor heat exchanger. These indoor units, being connected to the outdoor unit, are capable of cooling operation and heating operation.

An example of this technique is described in detail in Japanese Patent Publication (Kokoku) Nos. 61-45145/1986 and 64-57061/1989.

Furthermore, in U.S. Pat. No. 4,878,357, Sekigami et al. shows a multiroom air conditioning apparatus that includes a plurality of outdoor heat exchangers for carrying out simultaneous room cooling and heating operations.

In such an air conditioner, during heating operation, the outdoor heat exchanger operates as an evaporator. Frost gradually sticks to the surface of the outdoor heat exchanger, and a lowering of the heating capacity occurs. It is conventional to melt this frost on the outdoor heat exchanger by allowing a high temperature refrigerant discharged from the compressor to flow to the outdoor heat exchanger. This can be done either periodically as determined by a timer etc., or as required, based on the temperature of the outdoor heat exchanger.

However, when defrosting is carried out by supplying high temperature refrigerant as described above, the indoor heat exchangers act as evaporators. As a result cold air is discharged into the rooms.

SUMMARY OF THE INVENTION

Accordingly, it is an object of the present invention to provide a multiple air conditioning apparatus in which an outdoor heat exchanger can be reliably defrosted without discharging cold air into the rooms.

It is a further object of the present invention to provide a multiple air conditioning apparatus which is capable of ensuring satisfactory heating performance.

In accordance with the present invention, the foregoing objects are achieved by providing a multiple air conditioning apparatus having at least one outdoor unit and a plurality of indoor units. A compressor is disposed in the outdoor unit for compressing a refrigerant fluid. A main outdoor heat exchanger arranged in the outdoor unit, is connected to the compressor An auxiliary outdoor heat exchanger arranged in vicinity of the main outdoor heat exchanger, is also connected to the compressor. A plurality of indoor heat exchangers is arranged in the indoor units respectively. In the heating operation, a defrosting device of the main outdoor heat exchanger supplies the refrigerant discharged from the compressor to the main outdoor heat exchanger and the indoor heat exchangers and returns the refrigerant, which has passed through the main outdoor heat exchanger and the indoor heat exchangers, to the compressor through the auxiliary outdoor heat exchanger.

BRIEF DESCRIPTION OF THE DRAWINGS

These and other objects and advantages of this invention will become more apparent from the following detailed description of the presently preferred embodiment of the invention, taken in conjunction with the accompanying drawings of which.

DETAILED DESCRIPTION OF THE PREFERRED EMBODIMENT

The preferred embodiment of the present invention will now be described in more detail with reference to the accompanying drawings.

Figure 1:
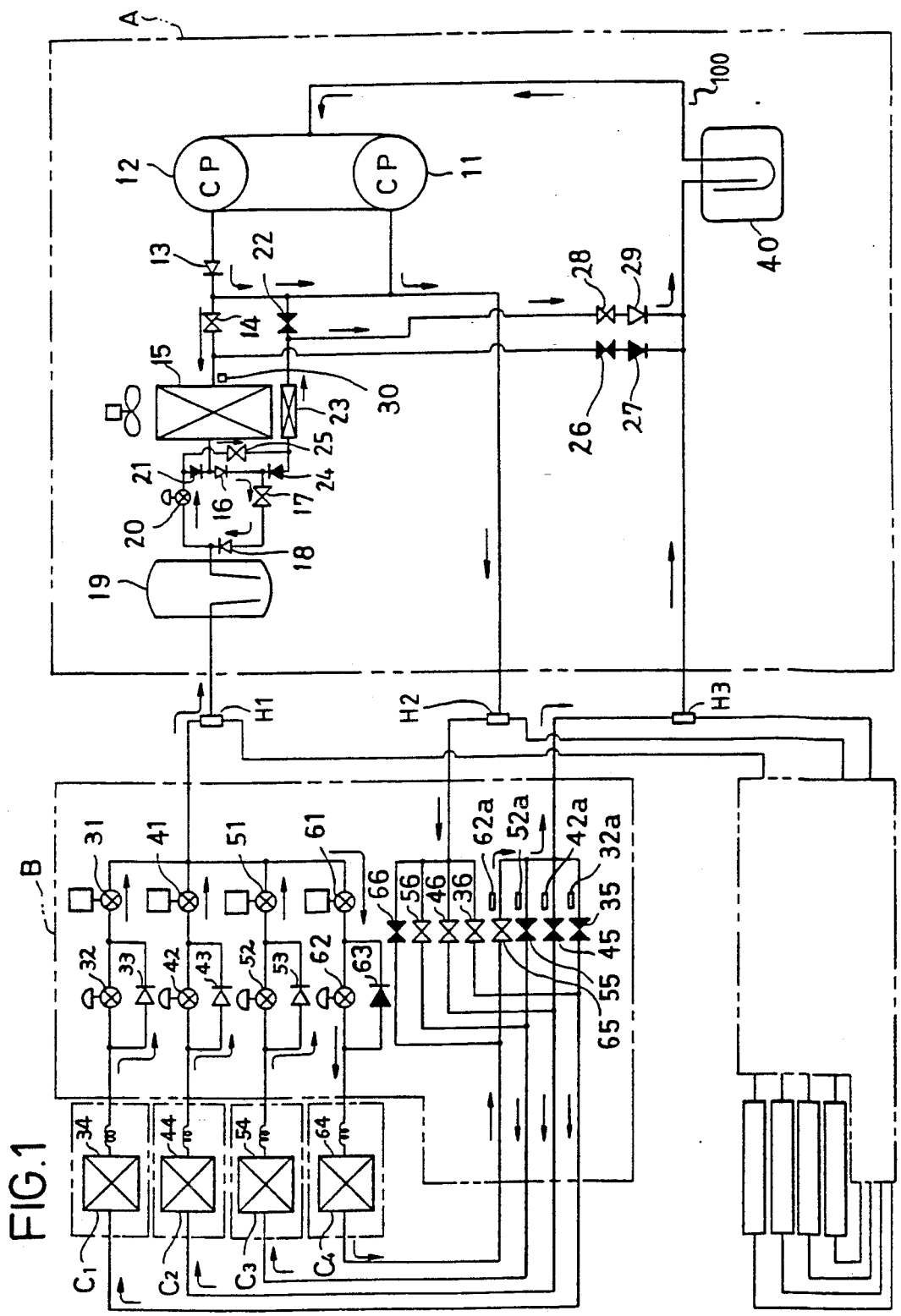
FIG. 1 is a diagram showing the layout of a refrigeration cycle showing the flow of refrigerant during defrosting operation of an embodiment of present invention.

In FIG. 1, A is a single outdoor unit, which is connected by piping to a plurality of indoor units C1, C2, C3 and C4 through a branch unit B. The outdoor unit A is equipped with a variable capacity compressor and a variable capacity compressor 12 of smaller capacity. Refrigerant discharge ports or outlets of compressors 11, 12 are connected to a main outdoor heat exchanger 15 through a non- return valve 13 and a two way valve 14. The main outdoor heat exchanger 15 is connected to a header H1 through a non-return valve 16, a two way valve 17, a non-return valve 18 and a liquid tank 19. The connecting part of the non-return valve 18 and the liquid tank 19 is connected to a connection between the main outdoor heat exchanger 15 and the non-return valve 16 through a heating expansion valve 20 and a non-return valve 21. The connection between the non-return valve 13 and the two way valve 14 is connected through a two way valve 22 to one side of an auxiliary outdoor heat exchanger 23. The other side of auxiliary outdoor heat exchanger 23 is connected to the connection between the non-return valve 16 and the two way valve 17 through non- return valve 24. The connection between the expansion valve 20 and the non-return valve 21 is connected to the other side of the auxiliary outdoor heat exchanger 23 through a two way valve 25. The connection between the two way valve 14 and the main outdoor heat exchanger 15 is connected to the refrigerant inlets 100 of the compressors 11 and 12 through a two way valve 26, a non-return valve 27 and an accumulator 40. The connection between the two way valve 22 and the auxiliary outdoor heat exchanger 23 is connected to the refrigerant inlets 100 of the compressors 11 and 12 through a two way valve 28, a non-return valve 29 and the accumulator 40.

The auxiliary heat exchanger 23 is arranged in the vicinity of the main outdoor heat exchanger 15. A heat exchanger temperature sensor 30 is mounted on the main outdoor heat exchanger 15. Indoor heat exchangers 34, 44, 54 and 64 are connected to the header H1, which may or may not be incorporated in a single unit with headers H2 and H3, through a parallel arrangement of pulse motor valves (hereinafter, PMV) 31, 41, 51 and 61, cooling cycle-forming expansion valves 32, 42, 52 and 62 and heating cycle-forming non-return valves 33, 43, 53 and 63. The indoor heat exchangers 34, 44, 54 and 64 are respectively connected to the header H3 through two way valves 35, 45, 55 and 65. The header H3 is connected to the refrigerant inlets 100 of the compressor 11 and 12 through the accumulator 40. The indoor heat exchangers 34, 44, 54 and 64 are respectively connected to the header H2 through two way valves 36, 46, 56 and 66. Header H2 is connected to the connection between the non-return valve 13 and the two way valve 14 and variable capacity compressor 11.

The connections between the liquid tank 19 and PMV 31, 41, 51 and 61 function as liquid side pipes. Refrigerant from the compressor is condensed at the condenser and is sent to liquid tank 19. Only liquid refrigerant is sent to the above-mentioned piping. In cooling mode, liquid refrigerant is supplied to the indoor heat exchanger through the expanding valve. At the indoor heat exchanger, evaporation is performed. In heating mode or defrosting mode, the refrigerant which is condensed and liquified at the indoor heat exchanger is supplied to the liquid tank. The connections between the two-way valve 35, 45, 55, 65 and the accumulator 40 function as gas side pipes. Connections between the two way valve 36, 46, 56, 66 and the refrigerant outlet of the compressor 11, 12 function as gas side pipes. In cooling mode, refrigerant which is changed to gaseous matter by evaporation at the indoor heat exchanger is returned to the compressor (low pressure gas piping). In heating mode or in defrosting mode, this piping is used to supply high temperature and high pressure gas from the compressor to the indoor heat exchanger. At the indoor heat exchanger, radiation of heat is performed (high pressure gas piping). The cooling cycle-forming expansion valves 32, 42, 52 and 62 are respectively provided with temperature sensitive tubes 32a, 42a, 52a and 62a. These temperature sensitive tubes are respectively mounted on the gas side pipes of two way valves 35, 45, 55, and 65.

Figure 2:
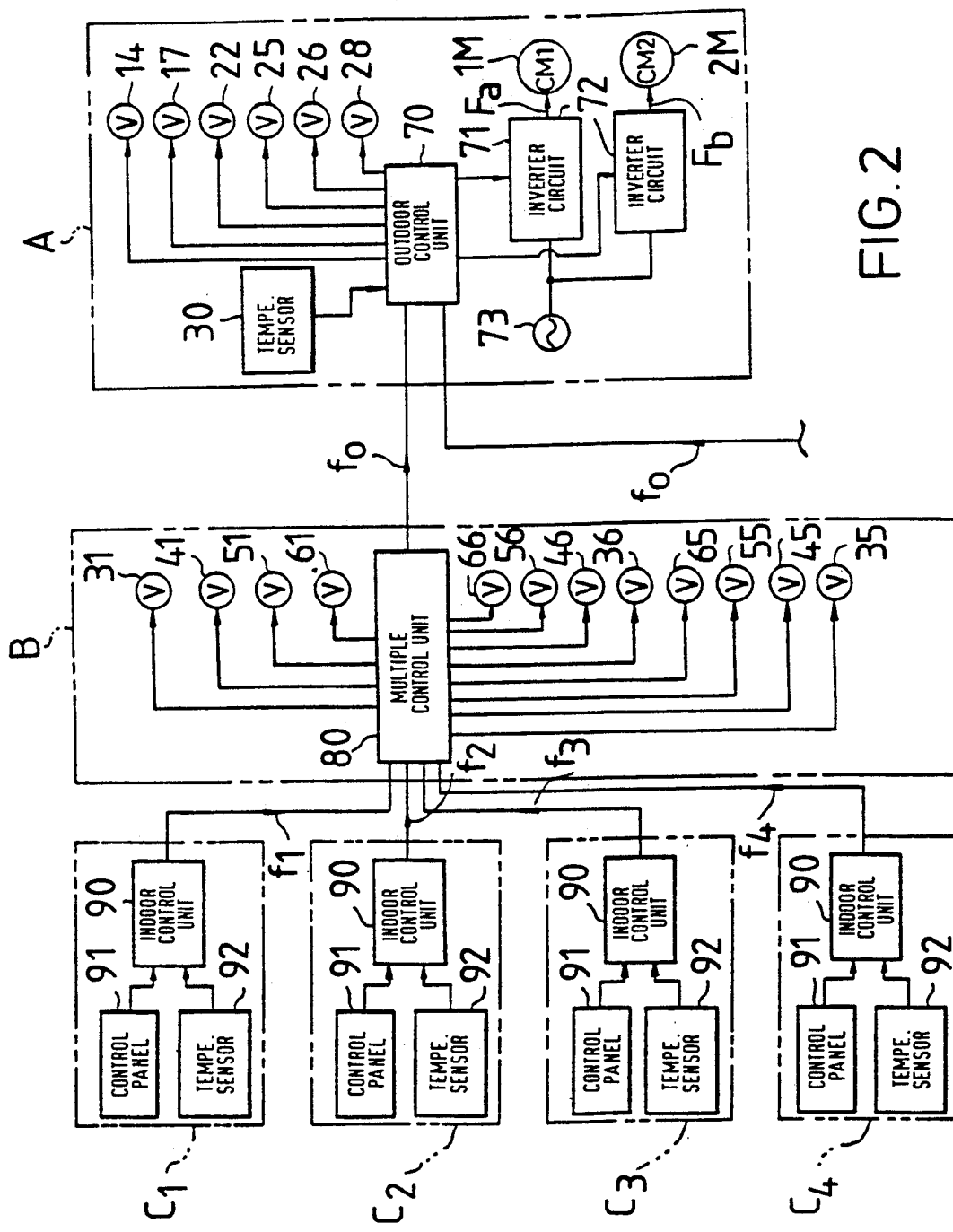
FIG. 2 is a block diagram showing the layout of a control circuit of present invention.

The control circuit of the refrigeration cycle which is above-mentioned is shown in FIG. 2. The outdoor unit A is equipped with an outdoor control unit 70. The outdoor control unit 70 is connected to a multiple control unit 80 of the branch unit B. The multiple control unit 80 is connected to respective indoor control units 90 of the indoor units C1, C2, C3 and C4. The outdoor control unit 70 consists of a microcomputer and peripheral circuits. The outdoor control unit 70 is externally connected to inverter circuits 71, 72, two way valves 14, 17, 22, 25, 26, and 28 and the heat exchanger temperature sensor 30. The inverter circuits 71 and 72 rectify the voltage of an A.C. power source 73, convert to an A.C. voltage of prescribed frequency by switching in response to commands from the outdoor control unit 70. The inverter circuits 71 and 72 supply converted A.C. voltage as drive power to respective compressor motors 1M and 2M. The multiple control unit 80 consists of a microcomputer and peripheral circuits. The multiple control unit 80 is externally connected to PMV 31, 41, 51 and 61, and two way valves 35, 45, 55, 65, 36, 46, and 56, and 66. The indoor control unit 90 consists of a microcomputer and peripheral circuits. The indoor control unit is externally connected to a respective control panel 91 and an indoor temperature sensor 92. Each indoor control unit 90 transmits to the multiple control unit 80 either cooling operation mode requests and request for cooling capacity or heating operation mode requests and request for heating capacity.

Thus, the outdoor control unit 70, multiple control unit 20 and the two way valves operate with the system elements described herein to control performance of the following functions:

First, when the total cooling capacity requested by one or a plurality of indoor units exceeds the total heating capacity requested by the remaining one or a plurality of indoor units, a cooling operation mode is set, passing the refrigerant discharged from the compressors 11 and 12 to the main outdoor heat exchanger 15 and the auxiliary outdoor heat exchanger 23, then passing the refrigerant to the one or a plurality of indoor units that have issued the request for the cooling operation mode, and returning the refrigerant to the compressors 11 and 12;

Second, in such a cooling operation mode, passing some of the refrigerant discharged from the compressors 11 and 12 through the one or a plurality of the indoor units that have issued the request for a heating operation mode, and then merging that refrigerant with the flow of the refrigerant to the one or a plurality of indoor units that have requested the cooling operation mode;

Third, when the total heating capacity requested by one or a plurality of indoor units exceeds the total cooling capacity requested by the remaining one or a plurality of indoor units, a heating operation mode is set, passing the refrigerant that is discharged from the compressors 11 and 12 to the one or a plurality of indoor units that have issued the request for heating operation mode, then passing the refrigerant to main outdoor heat exchanger 15 and return the refrigerant to the compressors 11 and 12;

Fourth, in such a heating operation mode, passing some of the refrigerant that has passed through the one or a plurality of indoor units that have issued the request for the heating operation mode to the one or a plurality of indoor units that have requested a cooling operation mode, and then returning the refrigerant to the compressors 11 and 12;

Fifth, defrosting in such a heating operation mode, if the detected temperature of heat exchanger temperature sensor 30 is below the set value, by supplying the refrigerant discharged from the compressors and 12 to the main outdoor heat exchanger 15 and to the one or a plurality of indoor heat exchangers that have issued a request for heating operation mode, and returning the refrigerant that has passed through the main outdoor heat exchanger 15 and all the indoor heat exchangers to the compressors 11 and 12 through auxiliary outdoor heat exchanger 23.

The operation of the layout and functions described above will now be explained.

Figure 3:
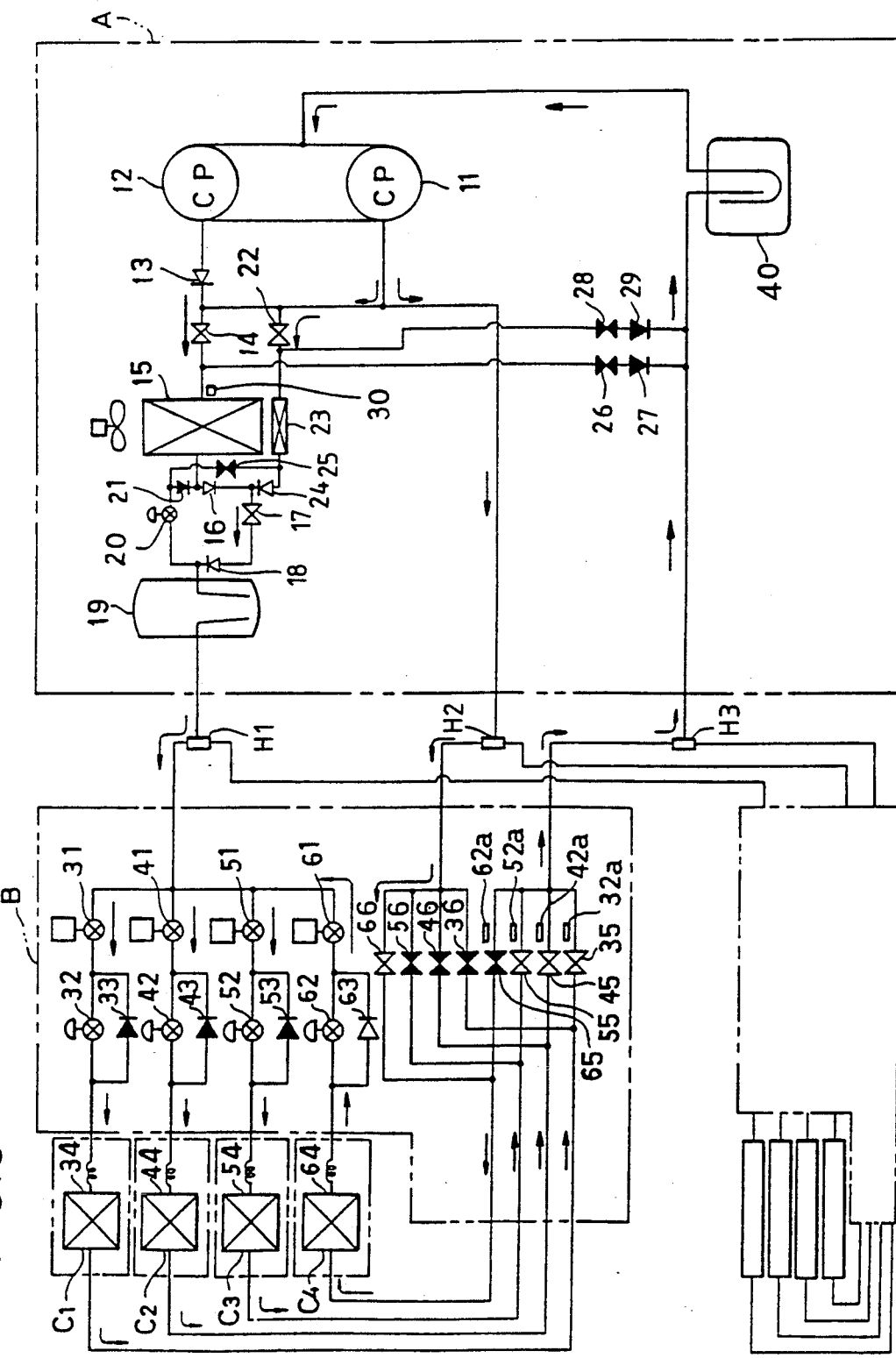
FIG. 3 is a view showing the flow of refrigerant in the cooling operation mode of this embodiment in shown FIG. 1.

Assume for example that the request from indoor units C1, C2 and C3 is for cooling operation mode, while the request from indoor unit C4 is for heating operation mode. Thus, the total of requested cooling capacity is greater than the total of requested heating capacity. In this case, cooling operation mode is determined, and, as shown in FIG. 3, two way valves 14, 17 and 22 of the outdoor unit A are opened (shown white), and two way valves 25, 26 and 28 are closed (shown black). In branch unit B, PMV 31, 41, 51 and 61 are opened, two way valves 35, 45, 55 and 66 are opened (shown white), and two way valves 36, 46, 56 and 65 are closed (shown black).

Consequently, the refrigerant that is discharged from the compressors 11 and 12 passes through the main outdoor heat exchanger 15 and the auxiliary outdoor heat exchanger 23, next passes through the indoor units C1, C2 and C3 that have requested cooling operation mode, and is then fed into the compressor 11. Further, some of the refrigerant that is discharged from the compressors 11 and 12 enters the indoor unit C4 that has issued the request for heating operation mode, and the refrigerant that has passed the indoor unit C4 is merged with the flow of the refrigerant to the indoor units C1, C2 and C3 that have issued the request for cooling operation mode. That is, the main outdoor heat exchanger 15 and the auxiliary outdoor heat exchanger 23 act as condensers, while the indoor heat exchangers 34, 44 and 54 act as evaporators, while the indoor heat exchanger 64 acts as a condenser. In this case, some of the heat absorbed by the indoor units C1, C2 and C3 is utilized as discharged heat of the indoor unit C4. The output frequencies of the inverter circuits 71 and 72 are set in accordance with the total of cooling capacity requested. Therefore, the compressors 11 and 12 generate capacity sufficient to supply adequately the cooling capacity of the indoor units C1, C2, C3 of larger load. The degree of opening of PMV 31, 41 and 51 is then controlled in accordance with the cooling capacity requested by the indoor units C1, C2 and C3, so that the refrigerant is distributed in a suitable condition to the indoor units C1, C2 and C3. The amounts of the refrigerant flowing in the indoor heat exchangers 34, 44 and 54 are regulated by expansion valves 32, 42 and 42, such that the degree of overheating of the refrigerant is kept constant. In the case of the indoor unit C4, the degree of opening of PMV 61 is controlled by a refrigerant temperature sensor (not shown), such that the temperature of the refrigerant flowing out from the indoor heat exchanger 64 i.e., the degree of overcooling, is constant.

Figure 4:
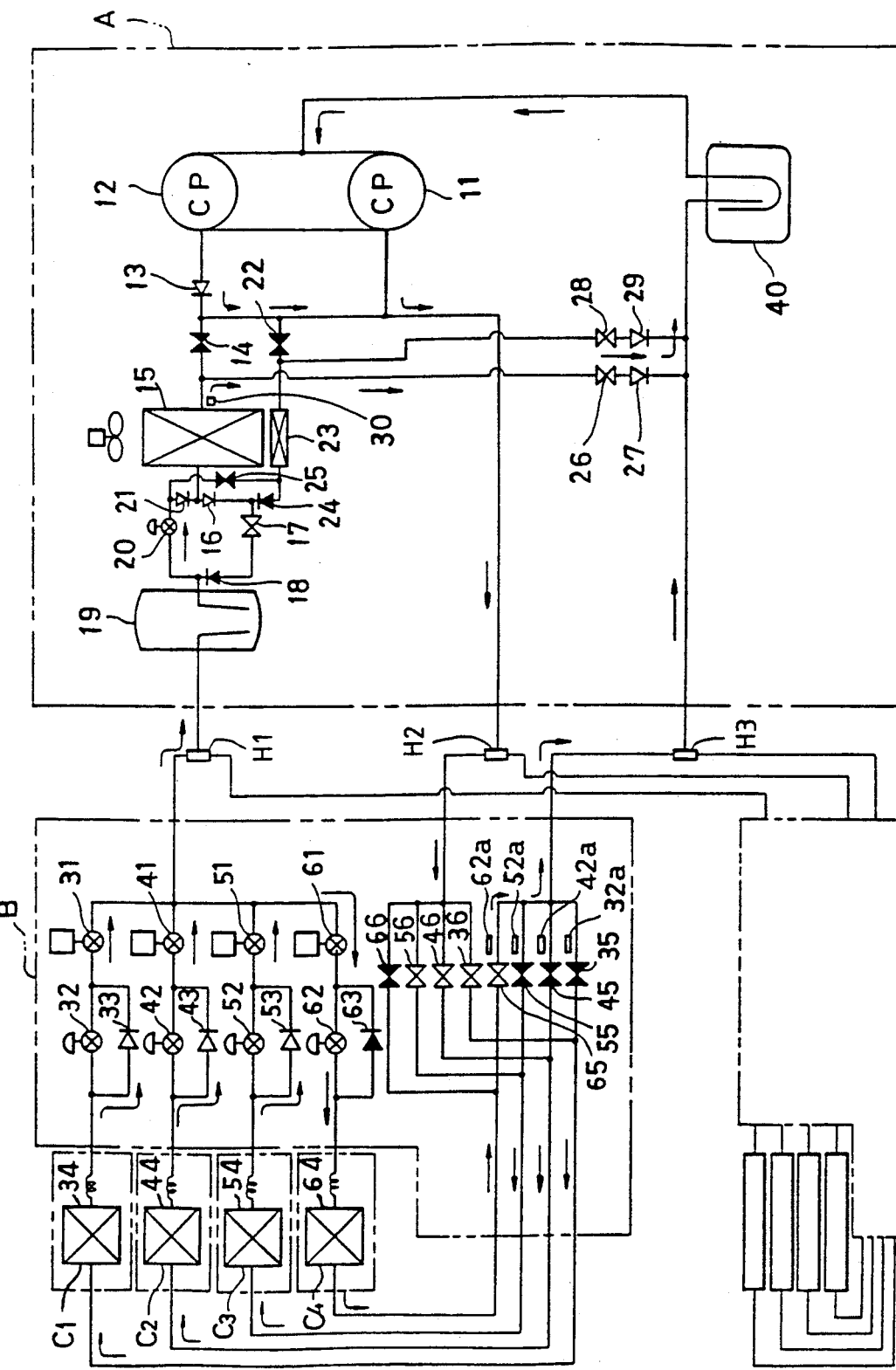
FIG. 4 is a view showing the flow of refrigerant in the heating operation mode of this embodiment in shown FIG. 1.

Next, assume for example that the request from the indoor units C1, C2 and C3 is for heating operation mode, while the request from the indoor unit C4 is for cooling operation mode. Thus, the total of requested heating capacity is greater than the total of requested cooling capacity. In this case, heating operation mode is determined. As shown in FIG. 4, two way valves 14, 22 and 25 of the outdoor unit A are closed (shown black), and two way valves 26 and 28 are opened (shown white). In branch unit B, PMV 31, 41, 51 and 61 are opened, two way valves 65, 36, 46 and 56 are opened (shown white) and two way valves 35, 45, 55 and 66 are closed (shown black).

Consequently, the refrigerant that is discharged from the compressors 11 and 12 passes through the indoor units C1, C2 and C3 that have requested heating operating mode, and is then fed into the compressors 11 and 12 through the outdoor heat exchanger 15. Further, some of the refrigerant that has passed through the indoor units C1, C2 and C3 enters indoor unit C4 that has issued the request for heating operation mode. The refrigerant that has passed the indoor unit C4 is merged with the flow of the refrigerant to the compressors 11 and 12. That is, the indoor heat exchangers 34, 44 and 54 act as condensers, the main outdoor heat exchanger 15 acts as an evaporator, while the indoor heat exchanger 64 acts as an evaporator. In this case, some of the heat absorbed by the main outdoor heat exchanger 15 and the indoor heat exchanger 64 is utilized as discharged heat of the indoor units C1, C2 and C3. The output frequencies of the inverter circuits 71 and 72 are set in accordance with the total heating capacity requested. Therefore, the compressors 11 and 12 generate capacity sufficient to supply adequately the heating capacity of the indoor units C1, C2, C3 of larger load. The degree of opening of PMV 31, 41 and 51 is then controlled in accordance with the heating capacity requested by the indoor units C1, C2 and C3, so that the refrigerant is distributed in a suitable condition to the indoor units C1, C2 and C3. In the case of the indoor unit C4, adequate cooling capacity is ensured by regulating with expansion valve 62 the amount of the refrigerant flowing in the indoor heat exchanger 64, such that the degree of overheating of the refrigerant is kept constant.

In this heating operation mode, a frost gradually sticks to the surface of the main outdoor heat exchanger 15, which is acting as an evaporator. When the frost sticks to the main outdoor heat exchanger 15, the temperature of the main outdoor heat exchanger 15 drops, with the result that the temperature sensed by the heat exchanger temperature sensor 30 falls below the set value. In this case, defrosting is performed, as shown in FIG. 1, by closing two way valves 22 and 26 of the outdoor unit A (shown black), and opening two way valves 14, 17, 25 and 28 (shown white). There is no change in the valve of branch unit B. Therefore, the refrigerant discharged from the compressors 11 and 12 flows directly to the main outdoor heat exchanger 15. The frost on the main outdoor heat exchanger 15 is then melted by the heat of the refrigerant. After passing through the main heat exchanger 15, the refrigerant enters the auxiliary heat exchanger 23 through the non-return valve 16, the two way valve 17, the non-return valve 18 and the expansion valve 20. Also, the refrigerant discharged from the compressors 11 and 12 enters the auxiliary heat exchanger 23 after passing through the indoor units C1, C2 and C3 that have issued the request for heating operation mode, and after passing through the expansion valve 20. The auxiliary outdoor heat exchanger 23 evaporates the refrigerant by taking heat from the atmosphere. After passing through auxiliary heat exchanger 23, the refrigerant is fed to the compressors 11 and 12 through the two way valve 28 and the non-return valve 29. When, as a result of the removal of the frost on the main outdoor heat exchanger 15, the temperature detected by the heat exchanger temperature sensor 30 gets above the prescribed value, all the valves of the outdoor unit A return to the condition of FIG. 4, so that the ordinary heating operation mode is restored.

Thus, a sufficient heating capacity can always be guaranteed, since any frost that has stuck on the main outdoor heat exchanger 15 can be rapidly and reliably removed by supplying the high temperature refrigerant discharged from the compressors 11 and 12 directly to the main heat exchanger 15.

Furthermore, since the flow of the refrigerant to the indoor units C1, C2 and C3 that have requested heating operation mode is maintained unaltered during heating operation, the inconvenience of a current of cold air being blown into the rooms can be avoided.

Although the embodiment described above is arranged for a defrosting operation to be performed whenever the temperature of the main heat exchanger 15 drops below a set value, the invention is not restricted to this, and it could be arranged for defrosting operation to be performed periodically in accordance with the lapsed time of a timer.

Numerous other modifications and variations of the present invention are possible in light of the above teachings. It is therefore to be understood that, within the scope of the appended claims, the present invention can be practiced in a manner other than as specifically described herein.

What is claimed is:

1. A multiple air conditioning apparatus having at least one outdoor unit and a plurality of indoor units comprising:

a compressor disposed in said outdoor unit for compressing a refrigerant fluid;

a main outdoor heat exchanger arranged in said outdoor unit, the main outdoor heat exchanger being connected to said compressor;

an auxiliary outdoor heat exchanger arranged in vicinity of said main outdoor heat exchanger, said auxiliary outdoor heat exchanger being connected to said compressor;

means for diverting refrigerant from said auxiliary outdoor heat exchanger except during cooling operation mode and during defrosting of said main outdoor heat exchanger;

a plurality of indoor heat exchangers arranged in said indoor units respectively; and means for defrosting said main outdoor heat exchanger, wherein in heating operation, said defrosting means supplies said refrigerant discharged from said compressor to said main outdoor heat exchanger and said indoor heat exchangers, and returns said refrigerant which has passed through said main outdoor heat exchanger and said indoor heat exchangers to said compressor through said auxiliary outdoor heat exchanger.

2. An apparatus according to claim 1, wherein said defrosting means is periodically activated.

3. An apparatus according to claim 1, wherein said defrosting means is activated as required from said main outdoor heat exchanger.

4. An apparatus according to claim 1, wherein said compressor is a variable capacity compressor.

5. An apparatus according to claim 1, further comprising a heat exchanger temperature sensor arranged in a vicinity of said main outdoor heat exchanger.

6. A multiple air conditioning apparatus having at least one outdoor unit, having an outdoor controller, and a plurality of indoor units having respective indoor controllers, connected to said outdoor unit, comprising:

a compressor disposed in said outdoor unit for compressing a refrigerant fluid;

a main outdoor heat exchanger arranged in said outdoor unit, said main outdoor heat exchanger being connected to said compressor;

an auxiliary outdoor heat exchanger arranged in a vicinity of said main outdoor heat exchanger, said auxiliary outdoor heat exchanger being connected to said compressor;

means for diverting refrigerant from said auxiliary outdoor heat exchanger except during cooling operation mode and during defrosting of said main outdoor heat exchangers;

a plurality of indoor heat exchangers arranged in said indoor units respectively;

a multiple controller for controlling a group of said indoor units, connected to said outdoor controllers, wherein said multiple controller receives cooling operation mode requests for cooling capacity and heating operation mode requested for heating capacity from each said indoor controller; and means for defrosting said outdoor heat exchanger, wherein in said outdoor heat exchanger, wherein in said heating operation mode, the defrosting means supplies said refrigerant discharged from said compressor to said main outdoor heat exchanger and said indoor heat exchangers, and returns said refrigerant which has passed through said main outdoor heat exchanger and said indoor heat exchangers to said compressor through said auxiliary outdoor heat exchanger.

7. An apparatus according to claim 6, wherein said defrosting means is activated periodically.

8. An apparatus according to claim 6, wherein said defrosting means is activated as required from said main outdoor heat exchanger.

9. An apparatus according to claim 6, wherein said compressor is a variable capacity compressor.

10. An apparatus according to claim 6, further comprising a heat exchanger temperature sensor arranged in a vicinity of said main outdoor heat exchanger.

11. An apparatus according to claim 6, further wherein said indoor controller is externally connected to a control panel.

12. An apparatus according to claim 6, further wherein said indoor controller is externally connected to an indoor temperature sensor.

13. An apparatus according to claim 6, wherein, when a total of cooling capacity requested by at least one of said indoor units is greater than a total heating capacity requested by remaining ones of said indoor units, said outdoor controller and said multiple controller set a cooling mode, and when a total of heating capacity requested by at least one of said indoor units is greater than a total cooling capacity requested by the remaining ones of said indoor units, said outdoor controller and said multiple controller set a heating mode.

* * * * *